United States Patent [19]

Wagner

[11] Patent Number: 4,458,776

[45] Date of Patent: Jul. 10, 1984

[54] CABLE SEALING MEANS IN A VEHICLE CAB

[75] Inventor: Robert J. Wagner, Milwaukee, Wis.

[73] Assignee: Allis-Chalmers Corp., Milwaukee, Wis.

[21] Appl. No.: 417,703

[22] Filed: Sep. 13, 1982

[51] Int. Cl.[3] .......... B60K 20/00

[52] U.S. Cl. .......... 180/315; 180/89.1; 181/200; 296/39 A

[58] Field of Search .......... 180/89.1, 89.13, 315; 296/39 A; 181/200, 201, 202, 203, 204, 205; 310/71, 88; 339/94 R, 94 A; 417/422; 174/65 R

[56] References Cited

U.S. PATENT DOCUMENTS 4,128,735 12/1978 Zehren .......... 174/65 R 4,191,273 3/1980 Williams .......... 180/89.13

*Primary Examiner*—Joseph F. Peters, Jr.
*Assistant Examiner*—Kenneth R. Rice
*Attorney, Agent, or Firm*—Arthur L. Nelson

[57] ABSTRACT

A sealing means on a vehicle cab for force and motion transmitting members between the control levers in the cab and the control devices external of the cab.

The force and motion transmitting members or energy transmitting members are connected to the controls and extend through an opening in the corner of one of the cab walls and the floor. A carrier plate having slots receives the cables or wires and a plate having a deformable layer is clamped between the cover plate and the carrier plate to form an airtight seal around the cables or wires thereby closing the opening in the wall and floor and providing an airtight seal and a thermal insulating medium as well as a sound dampening device.

10 Claims, 8 Drawing Figures

CABLE SEALING MEANS IN A VEHICLE CAB

This invention relates to a sealing means on a vehicle cab and, more particularly, to a sealing means for force or movement transmitting members or energy transmitting members operated by controls inside the cab to control devices outside of the cab.

A modern tractor and particularly the larger tractors have operator stations defined by a cab. The cab is generally air conditioned and is thermally insulated from the ambient air and also provides quiet operating conditions. The controls within the cab operate devices externally of the cab and accordingly a force or motion transmitting means operates between the controls within the cab and the operated device.

Accordingly, this invention covers a sealing means for sealing the motion or force transmitting means to maintain quiet operating conditions and a thermally insulated cab.

It is an object of this invention to provide a sealing means in a vehicle cab for sealing force and motion transmitting elements extending through the vehicle cab wall which are operated from the operator station.

It is another object of this invention to provide a sealing means in the vehicle cab for sealing control cables or wiring in the wall of the vehicle cab.

It is a further object of this invention to provide a clamping means including a plate clamped to the wall of a cab having an opening and deformable means carrying the control cables intermediate the plate and the wall for sealing around the cables and closing the opening in the cab wall.

The objects of this invention are accomplished in a vehicle having a cab and controls mounted therein. Force and motion transmitting members or energy transmitting members are connected to the controls and extend through an opening at a corner of one of the cab walls and the floor. A carrier plate having slots receives the cables or wires and a plate having a deformable layer is clamped against the walls to form an airtight seal around the cables or wires and closing the opening in the wall and floor to provide a thermal insulating medium and a sound damping means.

The Williams patent, U.S. Pat. No. 4,191,273, Seal and Sound Attenuator for Control Console, shows a sealing device for sealing cables extending from the control console in the cab through the floor. The insulating material is wrapped around the control cables and then tightened to deform the material and provide a sound attenuating seal within the control console and seal openings around the cables. The seal would provide sound attenuation and a measure of thermal insulation between the internal and external sides of the cab floor.

The applicant's invention also provides for thermal insulation and sound attenuation. The cables and wiring are positioned in a deformable layer between the clamping means of the plate clamped to the cab wall to form a thermal insulating medium and a sound attenuating medium while closing the opening in the cab wall and floor. The opening in the cab wall and floor is preformed and the insulating medium is adaptable for receiving the cables during assembly of the vehicle cab. The applicant's invention provides a more permanent seal arrangement, convenience of installing and assures thermal insulation, as well as sound attenuating when assembled.

Referring to the drawings, the preferred embodiment of this invention is illustrated.

Figure 1:
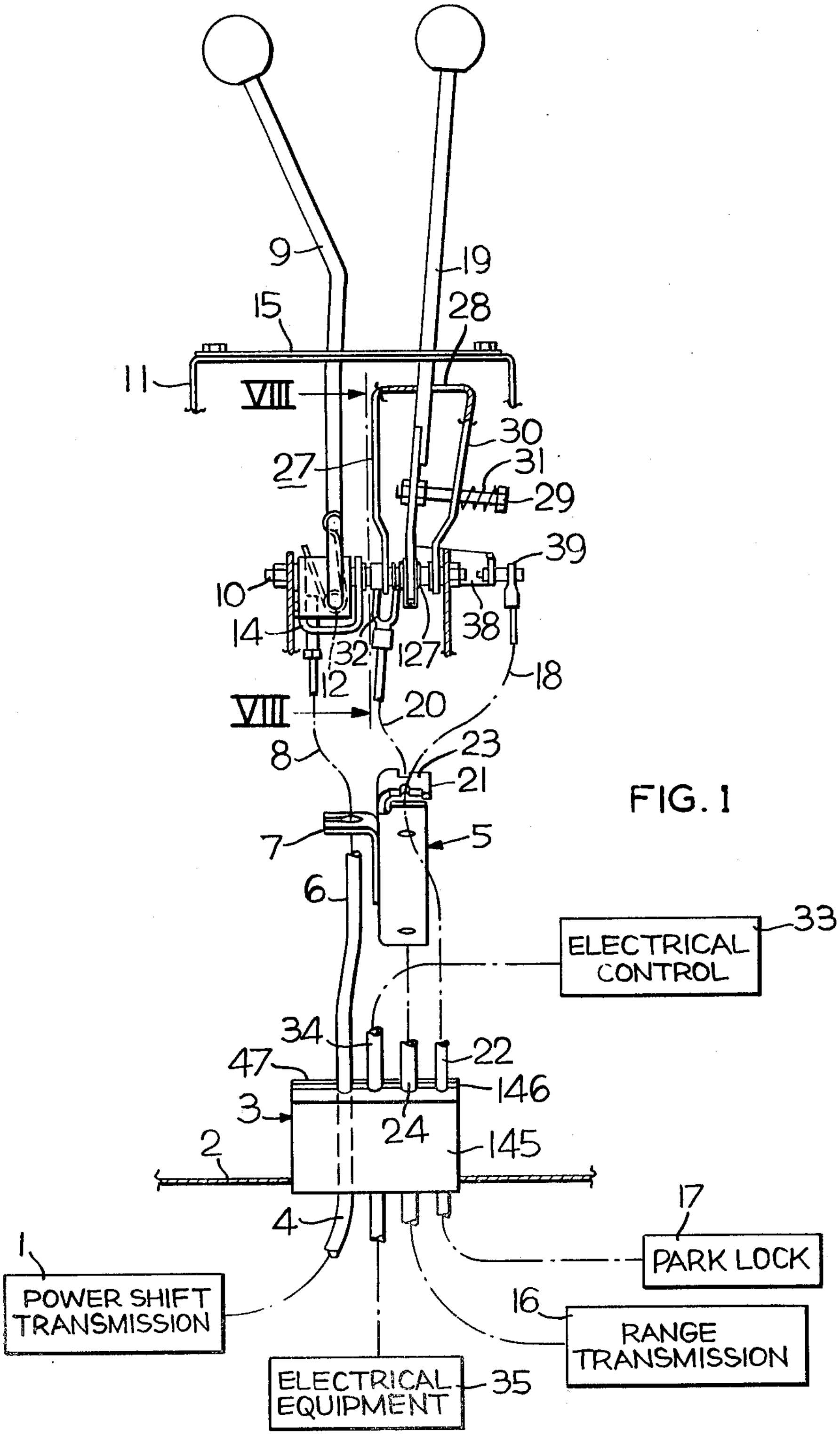
FIG. 1 illustrates a rear elevation view of the shift levers for the power shift transmission and the range shift transmission and park lock with cables extending through a thermal insulation and sound attenuating medium to operate the power shift transmission and the range transmission and park lock.
Figure 5:
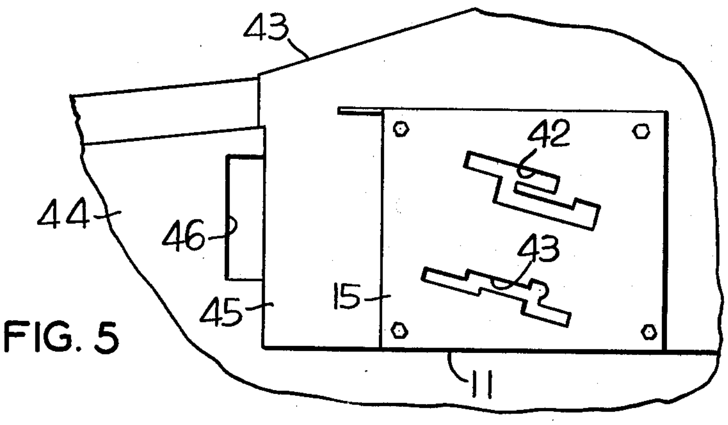
FIG. 5 is a plan view in the vehicle cab showing the opening in the floor of the cab and the gate plate for the levers.
Figure 4:
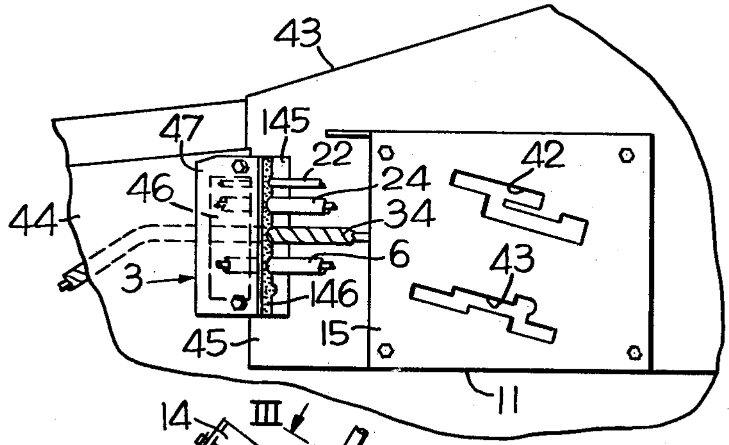
FIG. 4 is a plan view of the thermal insulating and sound attenuating device in a vehicle cab.
Figure 2:
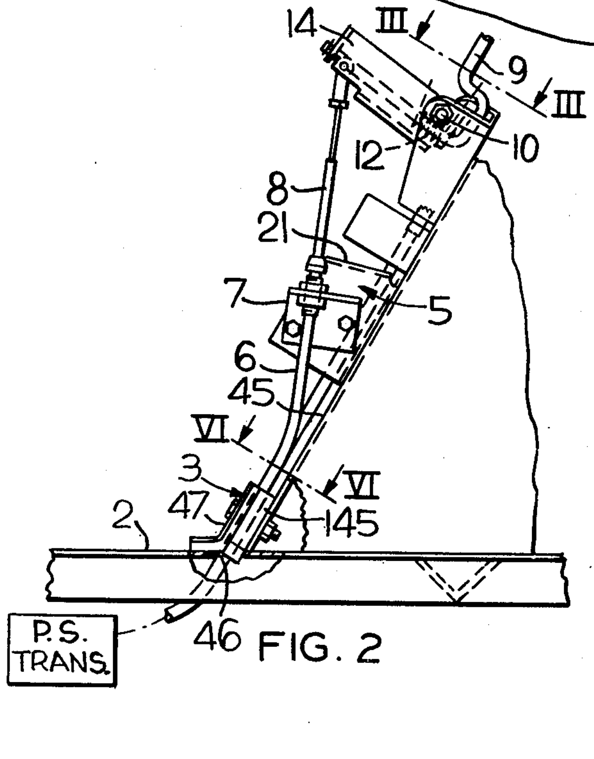
FIG. 2 illustrates a side view of the control lever and cable actuator for the power shift transmission and the range transmission.

Referring to the drawings, the preferred embodiment of this invention is illustrated. FIG. 1 shows a power shift transmission 1 mounted below the floor 2 of the vehicle cab. A cable sealing device 3 is mounted on the wall of the cab as well as the floor 2. The sheathed cable 4 extends from the power shift transmission 1 through the sealing device 3 to the support 7 of bracket 5 for the sheath 6 of the cable. The sheath 6 is fastened to the support 7 of the bracket 5 while the cable 8 is allowed to reciprocate within the sheath 6.

The cable 8 is connected to the power shift control lever 9 which is pivotally supported on the bolt 10 which in turn is mounted in the control console 11.

Power shift control lever 9 is biased in the right-hand direction by the spring 12 carried on the lever support bracket 14 which in turn is mounted on the bolt 10. The spring 12 biases the power shift control lever 9 into a latched position formed by the slots in the gate plate 15.

The range transmission 16 is also shown under the floor board 2 as shown in FIG. 1. A park lock mechanism 17 is shown under the floor board as well. The park lock mechanism 17 is connected to the cable 18 to the park lock and range shift lever 19. The range transmission 16 is connected through the sheathed cable 20 to the park lock and range shift lever 19. The sheathed cable 18 extends upwardly to the support 21 on bracket 5 where the sheath 22 is fastened. The sheath 24 of sheathed cable 20 is fastened to the support 23. The sheathed cable 20 is connected to the arm 26 of the range shift segment 27 of the park lock and range shift lever 19. Park lock and range shift lever 19 is mounted on the spherical bearing 127 and allowed to pivot on the bearing through a transverse slot in the portion 28 of the range shift segment 27. A bolt 29 extends through the side portion 30 of the range shift segment 27 of the lever 19. A spring 31 normally biases the lever to a right-hand position where it engages a notch in the slot of the gate plate 15 of the control console 11. Operation of the park lock cable 18 is accomplished by pivoting the park lock and range shift lever 19 transversely from right-to-left as shown in FIG. 1. Pivoting of the park lock and range shift lever 19 fore and aft will operate the range transmission through the sheathed cable 20.

Referring to FIG. 1, the power shift lever 9 and the range shift and park lock lever 19 are shown pivotally mounted in the console 11. The cable operating arm 14 of lever 9 is shown pivotally carried on the bolt 10. The range shift and park lock lever 19 and range shift segment 27 are also pivotally mounted on the bolt 10. The arm 26 carries the clevis 32 and cable 20 which operate the range shift transmission as the lever is pivoted on the shaft.

The electrical control 33 operates through the electrical wiring 34 extending to the sealing device 3 to operate electrical equipment 35.

Figure 3:
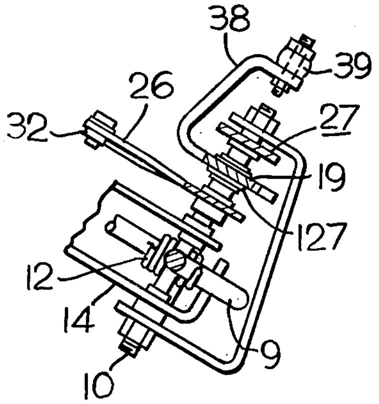
FIG. 3 illustrates a section view of the control lever support bolt taken on line III—III of FIG. 2.
Figure 8:
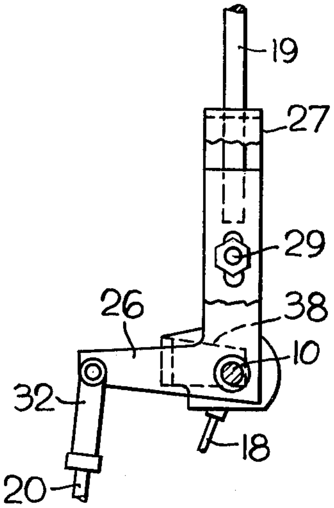
FIG. 8 is a cross section view taken on line VIII—VIII of FIG. 1.

FIG. 3 illustrates the bolt 10 which pivotally supports the range shift segment 27. The park lock and range shift lever 19 is supported on the park lock arm 38. The park lock arm 38 is pivoted on the spherical bearing 127 to operate the clevis 39 which in turn operates through the cable 18 to engage and disengage the park lock mechanism.

Gate plate 15 in the control console 11 defines the slot 42 for controlling the movement of the park lock and range shift lever 19 and the slot 43 for operating the power shift transmission lever 9. The vehicle cab 43 includes the floor 44 and the inclined wall 45 in the back of the cab. The control console 11 carries a gate plate 15. As the control levers are operated, the cable within their respective sheaths reciprically operate the control device external of the cab.

Figure 6:
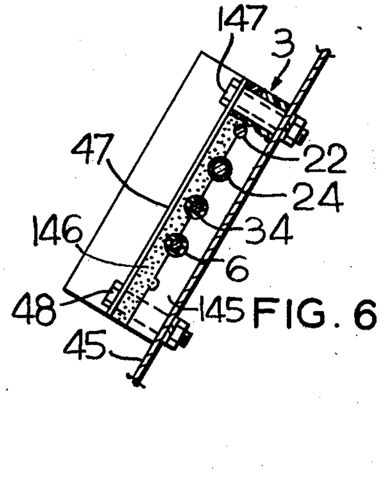
FIG. 6 is a cross section view taken on line VI—VI of FIG. 2.
Figure 7:
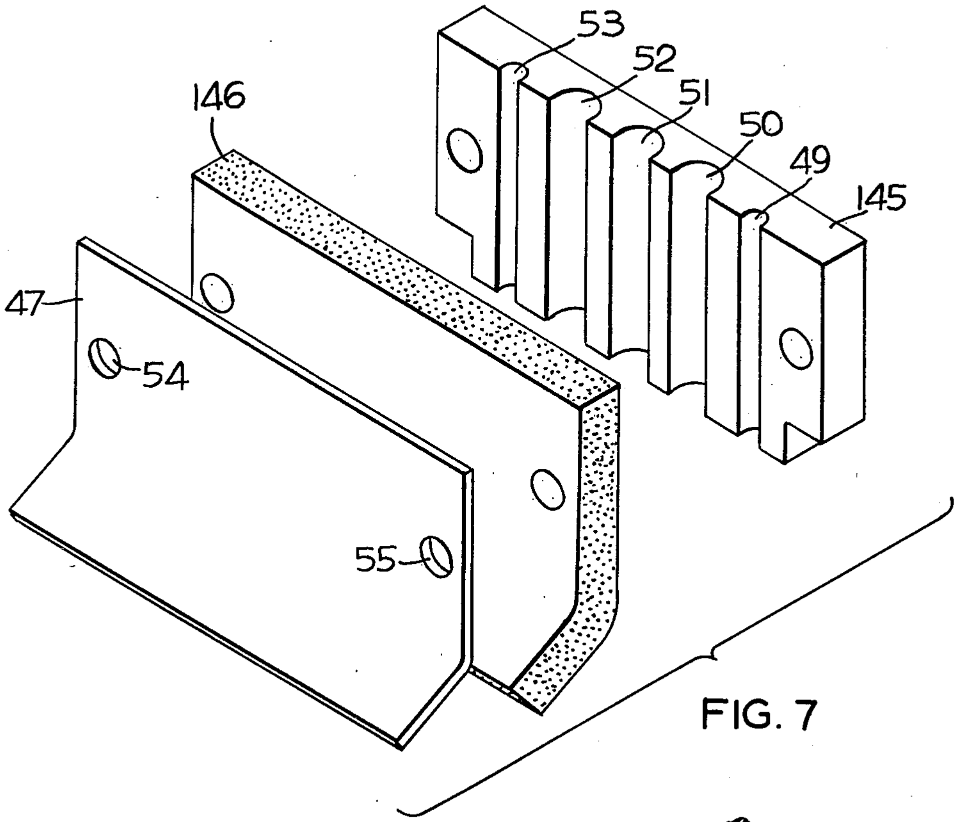
FIG. 7 illustrates the components of the sealing device showing a clamping plate and two components of the sealing medium.

FIGS. 6 and 7 illustrate a sealing device. The cable carrier plate 145 is mounted on wall 45 and extends downwardly into the opening 46 and carries the cables and the wiring and such motion transmitting items or energy transmitting items as necessary. The sealing medium 146 is of low permeability foam and is mounted on the neoprene carrier plate 145 and the cables and wiring are mounted within the slots therein. The plate 47 is clamped to the wall 45 by a plurality of bolts 147 and 48 which when clamped firmly to the wall forms the sealing medium 146 and plate 145 to form an air tight seal around the cables and a thermal insulation to minimize heat transfer through the sealing device.

The operation of the device will be described in the following paragraphs.

The cables shown are operated by one of the levers 9 or 19. As either of the levers is operated, a cable is reciprocated within the sheath to operate the power shift transmission 1 by the lever 9 or the range transmission 16 by lever 19 or the park lock mechanism 17 by the lever 19 as it is tilted transversely instead of fore and aft. This movement is transmitted through the cable sheath which in turn is carried by the sealing device. The cable sealing device includes a cable carrying plate 145 and the sealing medium 146 and the clamping plate 47. Each of the sheathed cables or wiring device is selectively positioned in one of the slots 49, 50, 51, 52, or 53. The sealing plate 146 is then positioned over the cable and the clamping plate 47 over the sealing device. Bolts are then positioned in the openings 54 and 55 and are tightened to form an air-tight seal around the cables in their assembled position. Since the sealing device is positioned over the hole 46, clamping of the plate 47 on the wall 45 will also press against the floor 44 to provide an air-tight seal over the opening at the same time the cables are sealed within the assembly. This provides a thermal seal and a sound attenuating seal when assembled.

The embodiments of the invention in which an exclusive property or privilege is claimed are defined as follows:

1. A vehicle cab having sealing means around a control means extending through a cab wall comprising, a vehicle cab defining an opening, control means mounted within the cab for generating a control signal, at least one signal transmitting control member connected to said control means and extending through the opening in the cab wall, a cover plate, a carrier plate for supporting said signal transmitting control member on said cab wall, a deformable sealing medium disposed around said signal transmitting member and positioned between said cover plate and said carrier plate on said cab wall, fastening means fastening said cover plate on said cab wall and compressively forming a seal by forcing said sealing medium around said signal transmitting member and between said cover plate and said carrier plate on said wall to close said opening.

2. A vehicle cab having sealing means around the control means extending through a cab wall as set forth in claim 1 wherein said signal generating means defines a shift lever generating a force and motion transmitting signal.

3. A vehicle cab having sealing means around control means extending through a cab wall as set forth in claim 1 wherein said control member defines a sheathed cable.

4. A vehicle cab having sealing means around control means extending through the cab wall as set forth in claim 1 wherein said control member defines electrical wiring.

5. A vehicle cab having sealing means around control means extending through a cab wall as set forth in claim 1 wherein said signal generating means defines a power shift transmission lever.

6. A vehicle cab having sealing means around control means extending through a cab wall as set forth in claim 1 wherein said sealing means defines low permeability material.

7. A vehicle cab having sealing means around control means extending through a cab wall as set forth in claim 1 wherein said sealing medium defines a thermal insulator.

8. A vehicle cab having sealing means around control means extending through a cab wall as set forth in claim 1 wherein the sealing medium includes a low permeability foam and said carrier plate defines a neoprene member.

9. A vehicle cab having sealing means around control means extending through a cab wall as set forth in claim 1 wherein said cab defines a hole at a corner between the floor and wall which forms an obtuse angle.

10. A vehicle cab having sealing means around control means extending through a cab wall as set forth in claim 1 wherein said cab defines an opening at the corner of the cab defined by the lower end of a wall and the floor of said cab, a plate defining an obtuse angle wherein said plate bears against a portion of the floor of said cab and said plate bears against a portion of said wall to thereby cover said opening at the corner of said cab and provide a sealing means for sealing around said members extending through said wall.

* * * * *